United States Patent
Tan et al.

(10) Patent No.: US 10,331,244 B2
(45) Date of Patent: Jun. 25, 2019

(54) NAVAGATION DEVICE WITH FAST FRAME RATE UPSHIFT AND OPERATING METHOD THEREOF

(71) Applicant: PixArt Imaging Inc., Hsin-Chu County (TW)

(72) Inventors: Zi-Hao Tan, Penang (MY); Kevin Len-Li Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 41 days.

(21) Appl. No.: 15/631,160

(22) Filed: Jun. 23, 2017

(65) Prior Publication Data
US 2018/0373352 A1    Dec. 27, 2018

(51) Int. Cl.
G06F 3/038     (2013.01)
G06F 3/0354    (2013.01)
G01P 15/03     (2006.01)

(52) U.S. Cl.
CPC .......... *G06F 3/0383* (2013.01); *G01P 15/032* (2013.01); *G06F 3/03543* (2013.01)

(58) Field of Classification Search
None
See application file for complete search history.

(56) References Cited

U.S. PATENT DOCUMENTS

| 6,995,748 B2 | 2/2006 | Gordon et al. | |
| 2004/0130532 A1* | 7/2004 | Gordon | G06F 1/3203 345/166 |
| 2005/0190158 A1* | 9/2005 | Casebolt | G06F 3/0317 345/166 |

* cited by examiner

*Primary Examiner* — Joseph R Haley
*Assistant Examiner* — Emily J Frank
(74) *Attorney, Agent, or Firm* — Hauptman Ham, LLP (57) ABSTRACT

A navigation device including an image sensor, a processor and a memory is provided. The memory stores a lookup table of a plurality of moving speeds each corresponding to one frame period. The image sensor captures image frames successively. The processor calculates a current speed according to a current image frame and a previous image frame, reads a frame period from the lookup table according to the calculated current speed, wherein the read frame period is multiplied by a ratio, which is smaller than 1, when an acceleration is confirmed by the processor according to the captured image frames.

18 Claims, 4 Drawing Sheets

| FRAME PERIOD (number of clocks) | MOVING SPEED (inch/second) | FRAME RATE (frames/second) |
|---|---|---|
| 22 | ≥ 27.49 | 2909 |
| 44 | 13.74 | 1455 |
| 66 | 9.16 | 970 |
| 88 | 6.87 | 727 |
| 110 | 5.50 | 582 |
| 132 | 4.58 | 485 |
| 154 | 3.93 | 416 |
| 176 | 3.44 | 364 |
| 198 | 3.05 | 323 |
| 220 | 2.75 | 291 |
| 242 | 2.50 | 264 |
| 264 | 2.29 | 242 |
| 286 | 2.11 | 224 |
| 308 | 1.96 | 208 |
| 330 | 1.83 | 194 |
| 352 | 1.72 | 182 |
| 374 | 1.62 | 171 |
| 396 | 1.53 | 162 |
| 418 | 1.45 | 153 |
| 440 | 1.37 | 145 |
| 462 | 1.31 | 139 |
| 484 | 1.25 | 132 |
| 506 | 1.20 | 126 |
| 528 | 1.15 | 121 |
| 550 | 1.10 | 116 |
| 572 | 1.06 | 112 |
| 594 | 1.02 | 108 |
| 616 | 0.98 | 104 |
| 638 | 0.95 | 100 |
| 660 | 0.92 | 97 |
| 682 | 0.89 | 94 |
| 704 | ≤ 0.86 | 91 |

NAVIGATION DEVICE WITH FAST FRAME RATE UPSHIFT AND OPERATING METHOD THEREOF

BACKGROUND

1. Field of the Disclosure

This disclosure generally relates to a navigation device and, more particularly, to a navigation device with a fast frame rate upshift and an operating method thereof.

2. Description of the Related Art

Conventionally, it is able to reduce the power consumption of an optical mouse by changing an image capture frequency of an image sensor thereof. For example, when the moving speed of the optical mouse is faster, an image capture frame rate of the image sensor becomes higher; on the contrary, when the moving speed of the optical mouse is slower, the image capture frame rate becomes lower. Accordingly, the total power consumption of the optical mouse can be reduced.

However, under the condition that the moving speed is extremely low, the image capture frame rate is arranged to be relatively slow such that when an acceleration or de-acceleration occurs, the so-called runaway or speed break can happen because the acceleration or de-acceleration that the optical mouse can handle is depending on the image capture frame rate.

Accordingly, the navigation device having a fast response to the abrupt acceleration or de-acceleration change is required.

SUMMARY

One object of the present disclosure is to provide a navigation device and an operation method thereof that upshift the image frame rate of an image sensor for capturing a next image frame as long as a detected acceleration or de-acceleration is large enough.

To achieve the above object, the present disclosure provides a navigation device including a memory, an image sensor and a processor. The navigation device detects displacement with respect to a surface. The memory stores a predetermined relationship between a plurality of moving speeds and a plurality of frame periods. The image sensor successively captures a second previous image frame, a previous image frame and a current image frame. The processor is electrically coupled to the memory and the image sensor. The processor calculates a previous displacement according to the second previous image frame and the previous image frame, calculates a current displacement and a current speed according to the previous image frame and the current image frame, reads a frame period from the memory according to the calculated current speed, determines a speed change according to the current displacement and the previous displacement, sets a next frame period as the read frame period when the speed change is smaller than an acceleration threshold, and sets the next frame period as the read frame period multiplied by an acceleration ratio, which is smaller than 1 and calculated according to the previous displacement and the current displacement, when the speed change is larger than the acceleration threshold.

The present disclosure further provides an operating method of a navigation device. The navigation device includes a memory, an image sensor and a processor electrically coupled to the memory and the image sensor. The operating method includes: successively capturing, by the image sensor, a second previous image frame, a previous image frame and a current image frame; calculating, by the processor, a previous displacement according to the second previous image frame and the previous image frame; calculating, by the processor, a current displacement and a current speed according to the previous image frame and the current image frame; reading a frame period from the memory according to the calculated current speed; determining, by the processor, a speed change according to the current displacement and the previous displacement; setting a next frame period as the read frame period when the speed change is smaller than an acceleration threshold; and setting the next frame period as the read frame period multiplied by an acceleration ratio, which is calculated according to the previous displacement and the current displacement, when the speed change is larger than the acceleration threshold.

The present disclosure further provides a navigation device including a memory, an image sensor and a processor. The navigation device detects displacement with respect to a surface. The memory stores a predetermined relationship between a plurality of moving speeds and a plurality of frame periods. The image sensor successively captures a second previous image frame, a previous image frame and a current image frame. The processor is electrically coupled to the memory and the image sensor. The processor calculates a previous displacement according to the second previous image frame and the previous image frame, calculates a current displacement and a current speed according to the previous image frame and the current image frame, reads a frame period from the memory according to the calculated current speed, determines an acceleration according to the current displacement and the previous displacement; and sets a next frame period as the read frame period multiplied by an acceleration ratio, wherein the acceleration ratio is 1 when the acceleration is smaller than an acceleration threshold while the acceleration ratio is smaller than 1 when the acceleration is larger than the acceleration threshold.

The navigation device and an operating method thereof of the present disclosure select a read frame period from a lookup table based on a calculated moving speed at first. The read frame period is used as a next frame period when an acceleration or de-acceleration is not detected, while the read frame period is multiplied by a ratio, which is smaller than 1, to obtain a shorter next frame period when an acceleration or de-acceleration is detected. Accordingly, the runaway or speed break does not happen even operating in an extremely low speed condition.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
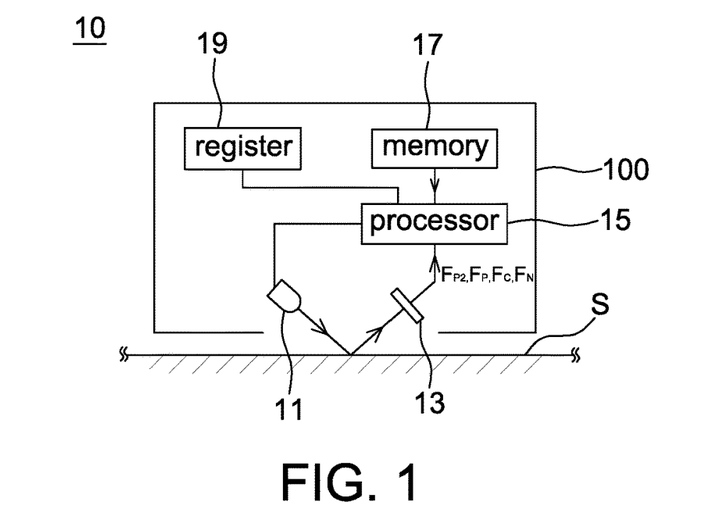
FIG. 1 is a schematic block diagram of a navigation device according to one embodiment of the present disclosure.

Referring to FIG. 1, it is a schematic block diagram of a navigation device 10 according to one embodiment of the present disclosure. The navigation device 10 of the present disclosure detects relative displacement with respect to a surface S, wherein the surface S is a table surface, a finger surface, a paper surface, a roller surface depending on different applications to which the navigation device 10 is applied. The navigation device 10 of the present disclosure is an optical mouse, an optical finger mouse or other optical displacement detection devices capable of detecting the relative displacement. During the detection, it is possible that the optical displacement detection device is fixed and the surface S is moving, or the optical displacement detection device is moving and the surface S is fixed.

The navigation device 10 includes a light source 11, an image sensor 13, a processor 15, a memory 17 and a register 19 electrically coupled to each other, e.g., through an electric board, signal line and/or semiconductor circuit. In some embodiments, these elements included in the navigation device 10 are arranged inside a housing 100 of the navigation device 10. The housing 100 preferably has an opening through which the navigation device 10 detects the relative displacement with respect to the surface S.

The light source 11 emits light of an identifiable spectrum to illuminate the surface S. Generally, said identifiable spectrum is arranged within an invisible spectrum such that the emitted light does not affect the user. For example, the light source 11 is at least one red light emitting diode (LED), at least one red laser diode, at least one infrared LED or at least one infrared laser diode, but not limited thereto.

The image sensor 13 receives light reflected from the surface S at a frame rate to output image frames. The image sensor 13 is a CMOS image sensor, a CCD image sensor or other optical sensors for generating raw data according to the received light from the surface S.

In some embodiments, the navigation device 10 further includes the light guiding element(s) for guiding the light emitted from the light source 11 and/or received by the image sensor 13. It is possible to arrange the light source 11 and the image sensor 13 as the so-called bright field arrangement or dark field arrangement according to different applications.

Figure 2:
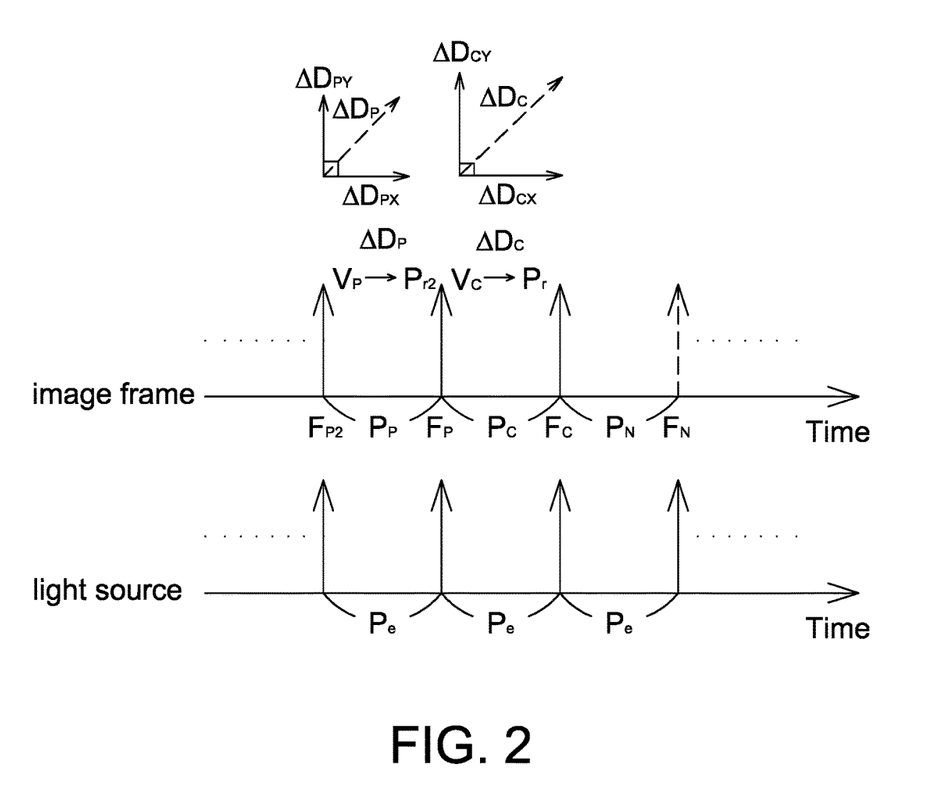
FIG. 2 is a schematic diagram of the image capturing and the light emission of a navigation device according to one embodiment of the present disclosure.

Referring to FIG. 2, it is a schematic diagram of the image capturing of an image sensor 13 and the light emission of a light source 11 of a navigation device 10 according to one embodiment of the present disclosure. In FIG. 2, one arrow in the second row refers to the light source 11 emitting light for a first predetermined time interval, and one arrow in the first row refers to the image sensor 13 receiving light for a second predetermined time interval. The first and second predetermined time intervals are identical to or different from one another.

The light source 11 is controlled by the processor 15 to illuminate light every an emission period Pe which is adjusted corresponding to the frame periods, e.g., $P_P$, $P_C$ and $P_N$, of the image sensor 13. The image sensor 13 is controlled by the processor 15 to capture image frames with an adjustable frame period (described later). For example, FIG. 2 shows that the image sensor 13 successively captures a second previous image frame $F_{P2}$, a previous image frame $F_P$, a current image frame Fc and a next image frame $F_N$. The second previous image frame $F_{P2}$ and the previous image frame $F_P$ are separated by a previous frame period $P_P$. The previous image frame $F_P$ and the current image frame $F_C$ are separated by a current frame period $P_C$. The current image frame $F_C$ and the next image frame $F_N$ are separated by a next frame period $P_N$. The emission periods Pe are different from one another if the frame periods e.g., $P_P$, $P_C$ and $P_N$ are different from one another. That is, the frame periods $P_P$, $P_C$ and $P_N$ are identical to or different from one other depending on the operating conditions.

The memory 17 includes a volatile and/or a nonvolatile memory device for storing a predetermined relationship between a plurality of moving speeds and a plurality of frame periods. Other parameters or algorithms for the operation are also stored in the memory 17. For example, referring to FIG. 3, it is a lookup table including a plurality of moving speeds each corresponding to one frame period and one frame rate. One example of setting the frame rate based on the moving speed may be referred to U.S. Pat. No. 6,995,748 B2, and the full disclosure of which is incorporated herein by reference.

Figure 3:
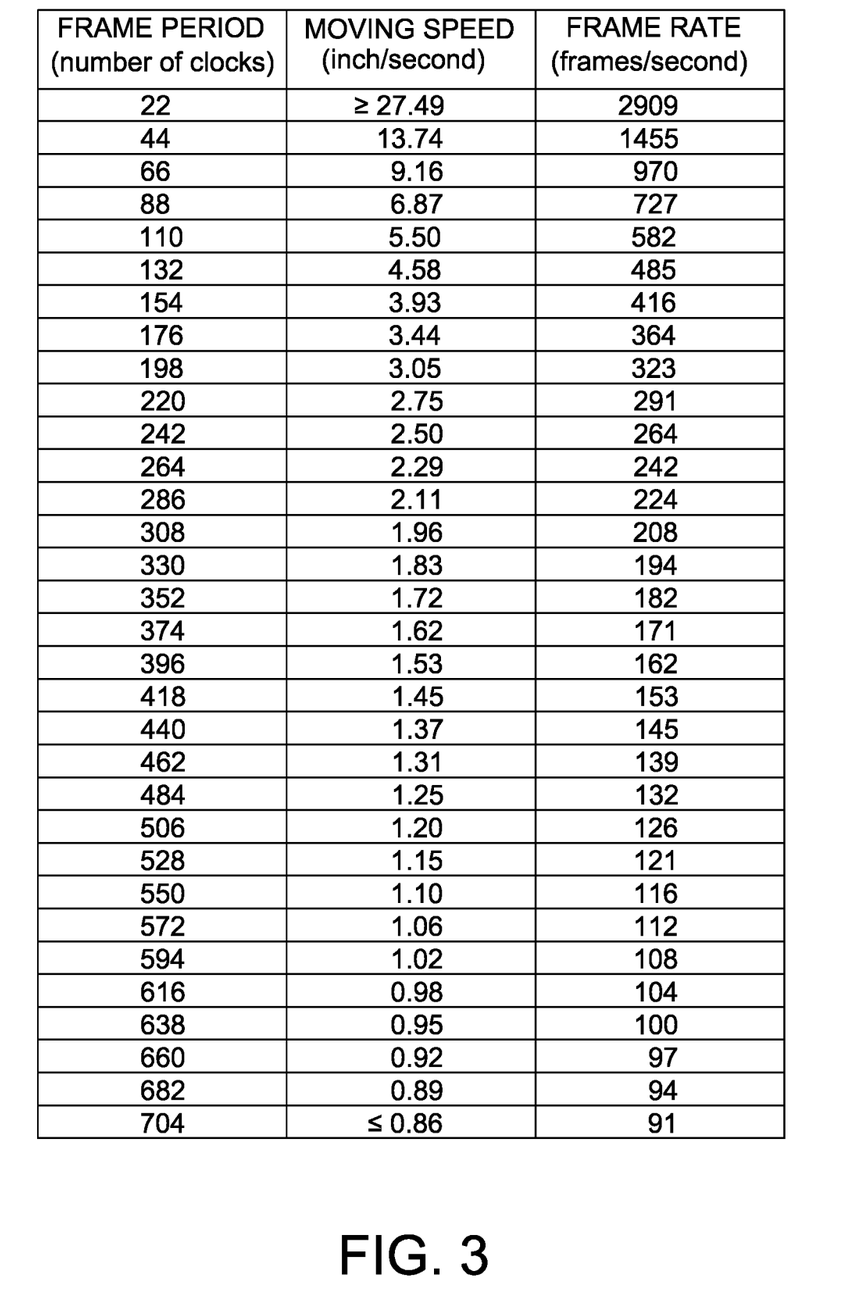
FIG. 3 is a lookup table including a plurality of moving speeds each corresponding to one frame period and one frame rate.

Preferably, the lookup table or the predetermined relationship is previously stored in the memory 17 before the shipment of the navigation device 10. It can be seen from FIG. 3 that if the moving speed is faster, the frame period is shorter and the frame rate is faster. It should be mentioned that although FIG. 3 shows both the frame period and the frame rate, it is only intended to illustrate but not to limit the present disclosure. As the frame rate is obtainable from the frame period and vice versa based on the frame period counter (FPC) clock of the navigation device 10, the memory 17 stores only one of the frame period and the frame rate. The other non-stored one is obtainable by the equation below:

$$\text{frame period} = \text{frame rate}/\text{FPC clock}$$

In FIG. 3, the FPC clock is 64 kHz.

The processor 15 is a central processing unit (CPU), a microcontroller (MCU), a digital signal processor (DSP), an application specific integrated circuit (ASIC) or the like. The processor 15 is electrically coupled to the memory 15 to access the lookup table and electrically coupled to the image sensor 13 to receive the image frames, e.g., $F_{P2}$, $F_P$, $F_C$ and $F_N$, from the image sensor 13 for post-processing. The above operation performed by the processor 15 is implemented by software codes and/or hardware codes without particular limitations. In the present disclosure, the processor 15 adjusts the frame period (or frame rate) based on FIG. 3 if an acceleration is not detected, while adjusts the frame period to be shorter than the frame period shown in FIG. 3 if an acceleration is detected. In is appreciated that if a value of the acceleration is smaller than 0, the de-acceleration is detected by the navigation device 10. In the present disclosure, the acceleration occurs when the calculated acceleration (e.g., speed change) is larger than an acceleration threshold.

In one embodiment, the processor 15 calculates a previous displacement according to the second previous image frame and the previous image frame, calculates a current displacement and a current speed according to the previous image frame and the current image frame, reads a frame period from the memory according to the calculated current speed, determines a speed change according to the current displacement and the previous displacement, sets a next frame period as the read frame period when the speed change is smaller than an acceleration threshold, and sets the next frame period as the read frame period multiplied by an acceleration ratio, which is smaller than 1 and calculated according to the previous displacement and the current displacement, when the speed change is larger than the acceleration threshold.

Referring to FIGS. 1-3, details of the above operation performed by the processor 15 in this embodiment are illustrated below.

The processor 15 controls the image sensor 13 to successively capture a second previous image frame $F_{P2}$, a previous image frame $F_P$ and a current image frame $F_C$. The processor 15 calculates a previous displacement $\Delta D_P$ by comparing the second previous image frame $F_{P2}$ and the previous image frame $F_P$, e.g., calculating the correlation between the second previous image frame $F_{P2}$ and the previous image frame $F_P$, but not limited thereto. The previous displacement $\Delta D_P$ includes a first direction previous displacement $\Delta D_{PX}$ and a second direction previous displacement $\Delta D_{PY}$, wherein the first direction X is perpendicular to the second direction Y in the present disclosure. The previous displacement $\Delta D_P$ is divided into the first direction previous displacement $\Delta D_{PX}$ and the second direction previous displacement $\Delta D_{PY}$ using triangulation.

In a similar way, the processor 15 calculates a current displacement $\Delta D_C$ by comparing the previous image frame $F_P$ and the current image frame Fc. The current displacement $\Delta D_C$ also includes a first direction current displacement $\Delta D_{CX}$ and a second direction current displacement $\Delta D_{CY}$.

Furthermore, the processor 15 calculates a current speed $V_C$ using the current displacement $\Delta D_C$ and a current frame period $P_C$ between the current image frame $F_C$ and the previous image frame $F_P$. Similarly, the current speed $V_C$ includes a first direction speed and a second direction speed. The first direction speed is calculated by dividing the first direction current displacement $\Delta D_{CX}$ by the current frame period $P_C$, and the second direction speed is calculated by dividing the second direction current displacement $\Delta D_{CY}$ by the current frame period $P_C$.

Then the processor 15 reads a frame period from the memory 17 according to the calculated current speed $V_C$. For example, the processor 15 compares the first direction speed and the second direction speed at first, and then selects the frame rate in FIG. 3 corresponding to a bigger one of the first direction speed and a second direction speed. More specifically, the processor 15 uses the first direction speed as the moving speed in FIG. 3 to select or calculate the corresponding frame period (i.e. the read frame period Pr) if the navigation device 10 moves more in the first direction than in the second direction; on the contrary, the processor 15 uses the second direction speed as the moving speed. For example, if one of the first direction speed and the second direction speed is larger than 27.49 inch per second (ips), the processor 15 selects frame period as 22 number of clocks. The corresponding frame rate is equal to 64000/22=2909 (fps). It is appreciated that values in FIG. 3 are only intended to illustrate but not to limit the present disclosure.

Finally, the processor 15 identifies whether an acceleration or de-acceleration (i.e. a negative acceleration) is detected so as to determine the next frame period $P_N$ for capturing a next image frame $F_N$. In one embodiment, the acceleration occurs if anyone of (i) a first direction difference, which is an absolute value, between the first direction previous displacement $\Delta D_{PX}$ and the first direction current displacement $\Delta D_{CX}$ and (2) a second direction difference, which is an absolute value, between the second direction previous displacement $\Delta D_{PY}$ and the second direction current displacement $\Delta D_{CY}$ is larger than an acceleration threshold, wherein the acceleration threshold is arranged as a half pixel size, one pixel size or others depending on different applications. The first direction difference (i.e. $|\Delta D_{PX}-\Delta D_{CX}|$) and the second direction difference (i.e. $|\Delta D_{PY}-\Delta D_{CY}|$) are referred to the speed change or the acceleration between the previous frame period $P_P$ and the current frame period $P_C$ herein.

Regarding the way of comparison, the processor 15 respectively compares the first direction difference (i.e. $|\Delta D_{PX}-\Delta D_{CX}|$) and the second direction difference (i.e. $|\Delta D_{PY}-\Delta D_{CY}|$) with the acceleration threshold, or compares a larger one of the first direction difference (i.e. $|\Delta D_{PX}-\Delta D_{CX}|$) and the second direction difference (i.e. $|\Delta D_{PY}-\Delta D_{CY}|$) with the acceleration threshold to confirm whether an enough acceleration occurs. In the present disclosure, the acceleration threshold is a fixed value or adaptively changeable.

If the acceleration is not detected (i.e. both the first and second direction differences smaller than the acceleration threshold), the next frame period $P_N$ is set as the read frame period Pr, which is read from the memory 17 according to the calculated current speed $V_C$ within the current frame period $P_C$.

If the acceleration is detected (i.e. any one the first direction difference and second direction difference larger than the acceleration threshold), the next frame period $P_N$ is set as the read frame period Pr multiplied by an acceleration ratio. The acceleration ratio is smaller than 1 and calculated according to the previous displacement $\Delta D_P$ and the current displacement $\Delta D_C$. For example, when the first direction difference (i.e. $|\Delta D_{PX}-\Delta D_{CX}|$) is larger than the second direction difference (i.e. $|\Delta D_{PY}-\Delta D_{CY}|$), a larger acceleration in the first direction, the acceleration ratio is set as a smaller one of (i) the first direction current displacement $\Delta D_{CX}$ divided by the first direction previous displacement $\Delta D_{PX}$, and (ii) the first direction previous displacement $\Delta D_{PX}$ divided by the first direction current displacement $\Delta D_{CX}$, i.e. the one of (i) and (ii) which is smaller than 1. However, when the second direction difference (i.e. $|\Delta D_{PY}-\Delta D_{CY}|$) is larger than the first direction difference (i.e. $|\Delta D_{PX}-\Delta D_{cx}|$), a larger acceleration in the second direction, the acceleration ratio is a smaller one of (i) the second direction current displacement $\Delta D_{CY}$ divided by the second direction previous displacement $\Delta D_{PY}$, and (ii) the second direction previous displacement $\Delta D_{PY}$ divided by the second direction current displacement $\Delta D_{CY}$, i.e. the one of (i) and (ii) which is smaller than 1. Accordingly, the next frame period $P_N$ is shorter than the read frame period Pr to avoid the runaway happens due to the existence of the acceleration.

In this way, the processor 15 sets the next frame period $P_N$ as the read frame period Pr or being shorter than the read frame period Pr. Using the similar process, the current frame period $P_C$ is another read frame period $P_{r2}$ (i.e. determined according to a previous moving speed $V_P$) accessed from the memory 17 or the another read frame period $P_{r2}$ multiplied by another acceleration ratio calculated within the previous frame period $P_P$.

In some embodiments, the navigation device 10 further includes a register 19 electrically coupled to the processor 15. The register 19 stores a flag bit indicating whether the acceleration is smaller or larger than the acceleration threshold. For example, the register 19 stores a digital value 0 or 1 if the acceleration is not detected (e.g., speed change smaller than an acceleration threshold) by the processor 15, and the digital value is changed to 1 or 0 if the acceleration is detected (e.g., speed change bigger than an acceleration threshold). In other embodiments, the register 19 is included in the memory 17 or the processor 15, but not limited to that shown in FIG. 1.

Figure 4:
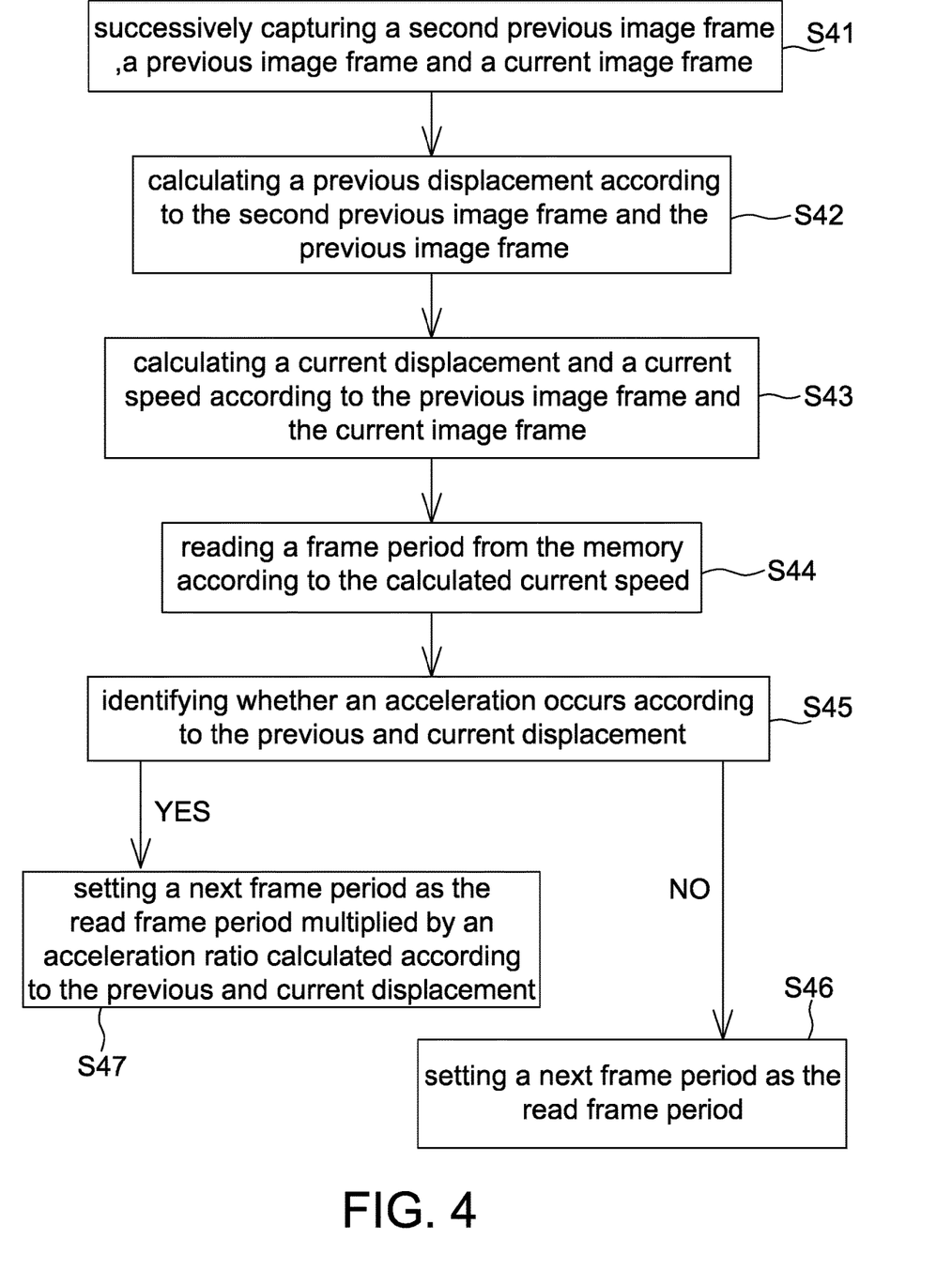
FIG. 4 is a flow chart of an operating method of a navigation device according to one embodiment of the present disclosure.

Referring to FIG. 4, it is a flow chart of an operating method of a navigation device according to one embodiment of the present disclosure. As mentioned above, the navigation device 10 includes a memory 17, an image sensor 13 and a processor 15 electrically coupled to the memory 17 and the image sensor 13. The operating method includes the steps of: successively capturing a second previous image frame, a previous image frame and a current image frame (Step S41); calculating a previous displacement according to the second previous image frame and the previous image frame (Step S42); calculating a current displacement and a current speed according to the previous image frame and the current image frame (Step S43); reading a frame period from the memory according to the calculated current speed (Step S44); identifying whether an acceleration occurs according to the current displacement and the previous displacement (Step S45); if no, setting a next frame period as the read frame period (Step S46); and if yes, setting the next frame period as the read frame period multiplied by an acceleration ratio calculated according to the previous displacement and the current displacement (Step S47). The operating method of this embodiment is applicable to the navigation device 10 shown in FIG. 1.

Referring to FIGS. 1-4, details of the operating method of this embodiment are illustrated below.

Step S41: The processor 15 controls the image sensor 13 to successively capture a second previous image frame $F_{P2}$ and a previous image frame $F_P$ separated by a previous frame period $P_P$, and captures the previous image frame $F_P$ and a current image frame $F_C$ separated by a current frame period $P_C$. Meanwhile, the processor 15 controls the light source 11 to illuminate corresponding to the image capturing of the image sensor 13.

Step S42: Next, the processor 15 calculates a previous displacement $\Delta D_P$ by comparing the second previous image frame $F_{P2}$ and the previous image frame $F_P$ using any suitable way. The previous displacement $\Delta D_P$ includes a first direction previous displacement $\Delta D_{PX}$ and a second direction previous displacement $\Delta D_{PY}$. It is possible that the previous displacement $\Delta D_P$ is calculated and temporarily stored, e.g., in the memory 17, before the current image frame $F_C$ is captured.

Step S43: The processor 15 calculates a current displacement $\Delta D_C$ by comparing the previous image frame $F_P$ and the current image frame $F_C$ using any suitable way. The current displacement $\Delta D_C$ also includes a first direction current displacement $\Delta D_{CX}$ and a second direction current displacement $\Delta D_{CY}$. Meanwhile, the processor 15 calculates a current speed $V_C$ using the current displacement $\Delta D_C$ and a current frame period $P_C$. The current speed $V_C$ is possible to be divided into two elements in a first direction (e.g., X direction) and a second direction (e.g., Y direction). The calculation of the first direction speed and the second direction speed has been illustrated above, and thus details thereof are not repeated herein.

Step S44: The processor 15 reads a frame period from the memory 17 according to a larger one of the first direction speed and the second direction speed.

Step S45: The processor 15 then confirms whether an acceleration is detected according to a speed change between the current displacement $\Delta D_C$ and the previous displacement $\Delta D_P$. As mentioned above, if any one of the first direction difference (i.e. $|\Delta D_{PX}-\Delta D_{CX}|$) and the second direction difference (i.e. $|\Delta D_{PY}-\Delta D_{CY}|$) is larger than an acceleration threshold, which is previously set based on pixel size, the processor 15 confirms the acceleration occurs.

Step S46: If the acceleration does not occur, e.g., by accessing the register 19, the processor 15 captures a next image frame $F_N$ after a next frame period $P_N$ which is directly set as a read frame period Pr corresponding to the calculated current speed $V_C$ (e.g., the first or second direction speed) by accessing the lookup table stored in the memory 17. The calculation of the current speed $V_C$ has been illustrated above and thus details thereof are not repeated herein.

Step S46: If the acceleration is detected, e.g., by accessing the register 19, the processor 15 sets a next frame period $P_N$ as a read frame period Pr multiplied by an acceleration ratio. As mentioned above, the processor 15 calculates the acceleration ratio using a larger speed change among the first and second directions. If the larger speed change is in the first direction, the processor 15 calculates the acceleration ratio by using a smaller one among the first direction current displacement $\Delta D_{CX}$ and the first direction previous displacement $\Delta D_{PX}$ to be divided by a larger one among the first direction current displacement $\Delta D_{CX}$ and the first direction previous displacement $\Delta D_{PX}$. However, if the larger speed change is in the second direction, the processor 15 calculates the acceleration ratio by using a smaller one among the second direction current displacement $\Delta D_{CY}$ and the second direction previous displacement $\Delta D_{PY}$ to be divided by a larger one among the second direction current displacement $\Delta D_{CY}$ and the second direction previous displacement $\Delta D_{PY}$.

In other embodiments, if the lookup table stored in the memory 17 includes a plurality of moving speed each corresponding to one frame rate as shown in the second and third columns in FIG. 3, the processor 15 increases the frame rate when the acceleration is detected. For example, the processor 15 sets a next frame rate as a read frame rate multiplied by an acceleration multiple which is larger than one. For example, if the larger speed change is in the first direction, the processor 15 calculates the acceleration multiple by using a larger one among the first direction current displacement $\Delta D_{CX}$ and the first direction previous displacement $\Delta D_{PX}$ to be divided by a smaller one among the first direction current displacement $\Delta D_{CX}$ and the first direction previous displacement $\Delta D_{PX}$. However, if the larger speed change is in the second direction, the processor 15 calculates the acceleration multiple by using a larger one among the second direction current displacement $\Delta D_{CY}$ and the second direction previous displacement $\Delta D_{PY}$ to be divided by a smaller one among the second direction current displacement $\Delta D_{CY}$ and the second direction previous displacement $\Delta D_{PY}$.

Figure 5:
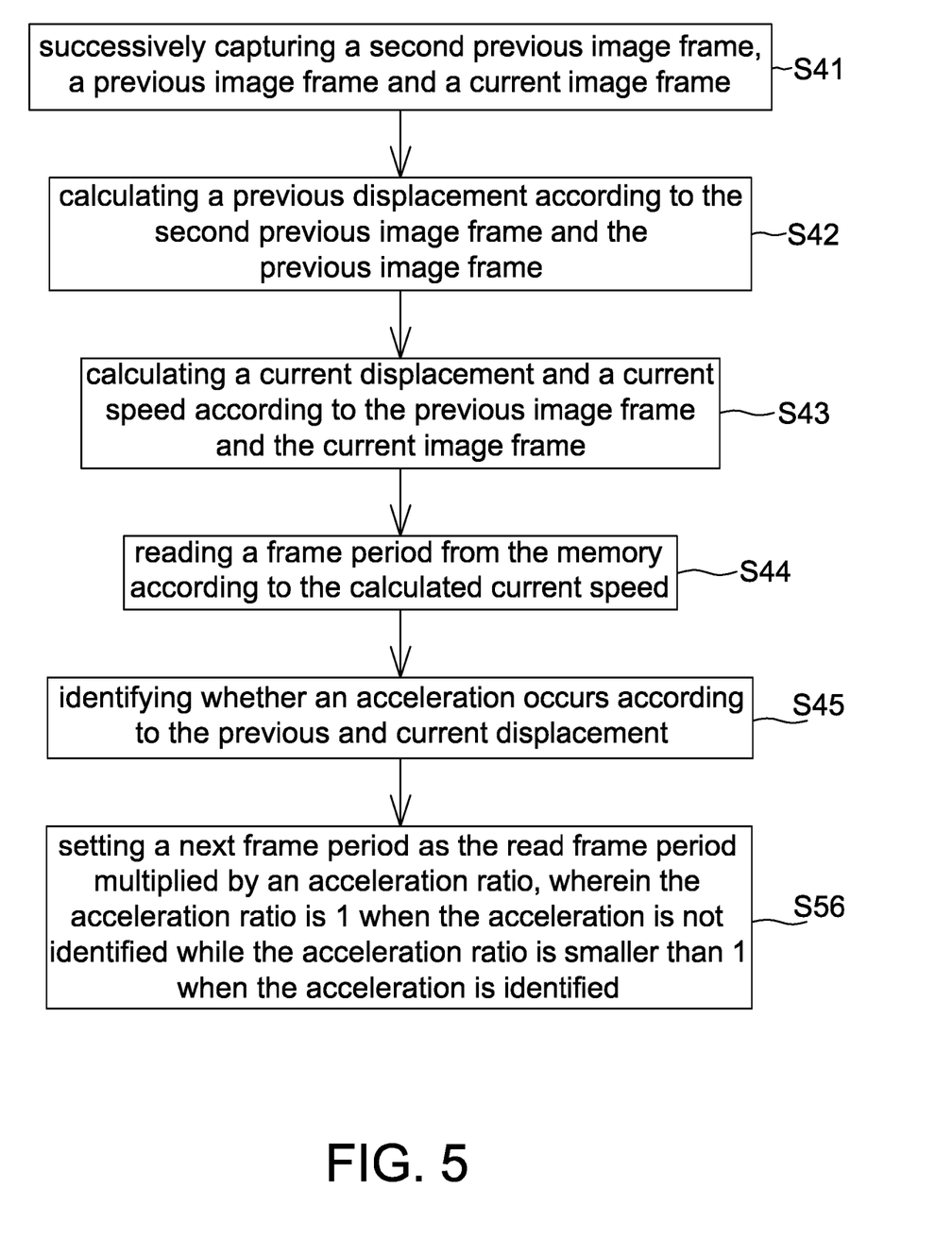
FIG. 5 is a flow chart of an operating method of a navigation device according to another embodiment of the present disclosure.

Referring to FIG. 5, it is a flow chart of an operating method of a navigation device according to another embodiment of the present disclosure. The operating method of this embodiment is also applicable to the navigation device 10 shown in FIG. 1. The operating method includes the steps of: successively capturing a second previous image frame, a previous image frame and a current image frame (Step S41); calculating a previous displacement according to the second previous image frame and the previous image frame (Step S42); calculating a current displacement and a current speed according to the previous image frame and the current image frame (Step S43); reading a frame period from the memory according to the calculated current speed (Step S44); identifying whether an acceleration occurs according to the current displacement and the previous displacement (Step S45); setting a next frame period as the read frame period multiplied by an acceleration ratio, wherein the acceleration ratio is 1 when the acceleration is not identified while the acceleration ratio is smaller than 1 when the acceleration is identified (Step S56). In this embodiment, steps identical to those of FIG. 4 are indicated by identical reference numerals.

The steps S41-S45 in FIG. 5 have been illustrated above in FIG. 4 and thus details thereof are not repeated herein.

Step S56: The processor 15 identifies whether an acceleration or de-acceleration occurs by comparing the acceleration, which is referred herein as a speed change between the previous frame period $P_P$ and the current frame period $P_C$, with an acceleration threshold. In some embodiments, the acceleration is calculated by $(|\Delta D_{PX}/P_P - \Delta D_{CX}/P_C|)$ or $(|\Delta D_{PY}/P_P - \Delta D_{CY}/P_C|)$ only the acceleration threshold is arranged as a different value.

The next frame period $P_N$ is set as the frame period, which is read in the Step S44, multiplied by an acceleration ratio. More specifically, in this embodiment, the processor 15 determines the acceleration ratio according to whether the acceleration is detected or not. If the acceleration is detected, the acceleration ratio is set as 1. If the acceleration is not detected, the acceleration ratio is set as being smaller than 1 to shorten the frame period. The calculation of the acceleration ratio is identical to that illustrated in FIG. 4 and thus details thereof are not repeated herein. As mentioned above, an acceleration multiple is set as being larger than 1 if the frame rates correspond to the moving speeds.

It should be mentioned that in the above embodiments the displacement and moving speed are separated into two elements in two orthogonal directions (e.g., X direction and Y direction), but it is only intended to illustrate but not to limit the present disclosure. In other embodiments, the acceleration threshold is compared with $|\Delta D_P - \Delta D_C|$ and the read frame period Pr is determined according to the current displacement $V_C$ instead of the sub-elements in two orthogonal directions. It is appreciated that in this case, values of the acceleration threshold and in the lookup table are set to be different from the above embodiments.

The operating method mentioned above is also applicable to a touchpad or a touch screen without being limited to optical displacement detection devices. In this case, the device employing the operating method of the present disclosure does not include a light source.

As mentioned above, as the so-called runaway or speed break often happens when an optical mouse operates in a very low speed if an image capture frame rate of the optical mouse is adjusted with the moving speed. Therefore, the present disclosure further provides a navigation device (FIG. 1) and an operating method thereof (FIGS. 4-5) that shorten a next frame period when an acceleration or de-acceleration is detected within a current frame period to upshift the frame rate. On the other hand, if the acceleration or de-acceleration is not detected, the next frame period is determined from a predetermined relationship between the moving speed and the image capture frame rate or the frame period.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device, configured to detect displacement with respect to a surface, the navigation device comprising:

a memory configured to store a predetermined relationship between a plurality of moving speeds and a plurality of frame periods;

an image sensor configured to successively capture a second previous image frame, a previous image frame and a current image frame; and a processor electrically coupled to the memory and the image sensor, and configured to
  calculate a previous displacement according to the second previous image frame and the previous image frame,
  calculate a current displacement and a current speed according to the previous image frame and the current image frame,
  read a frame period from the memory according to the calculated current speed,
  determine a speed change according to the current displacement and the previous displacement,
  set a next frame period as the read frame period when the speed change is smaller than an acceleration threshold, and
  set the next frame period as the read frame period multiplied by an acceleration ratio, which is smaller than 1 and calculated according to the previous displacement and the current displacement, when the speed change is larger than the acceleration threshold, wherein the previous displacement includes a first direction previous displacement and a second direction previous displacement, the current displacement includes a first direction current displacement and a second direction current displacement, the calculated current speed includes a first direction speed and a second direction speed, and the read frame period is determined according to a bigger one of the first direction speed and a second direction speed, and the speed change is a larger absolute value of (i) a first direction difference between the first direction previous displacement and the first direction current displacement, and (ii) a second direction difference between the second direction previous displacement and the second direction current displacement.

2. The navigation device as claimed in claim 1, wherein the first direction speed is calculated by dividing the first direction current displacement by a current frame period between the current image frame and the previous image frame; and the second direction speed is calculated by dividing the second direction current displacement by the current frame period.

3. The navigation device as claimed in claim 2, wherein the current frame period is another read frame period accessed from the memory or the another read frame period multiplied by another acceleration ratio.

4. The navigation device as claimed in claim 1, wherein when the first direction difference is larger than the second direction difference, the acceleration ratio is a smaller one of (i) the first direction current displacement divided by the first direction previous displacement, and (ii) the first direction previous displacement divided by the first direction current displacement; and when the second direction difference is larger than the first direction difference, the acceleration ratio is a smaller one of (i) the second direction current displacement divided by the second direction previous displacement, and (ii) the second direction previous displacement divided by the second direction current displacement.

5. The navigation device as claimed in claim 1, further comprising a register electrically coupled to the processor and configured to store a flag indicating whether the speed change is smaller or larger than the acceleration threshold.

6. The navigation device as claimed in claim 1, further comprising a light source configured to illuminate the surface, wherein the processor is further configured to adjust an emission period of the light source corresponding to the next frame period.

7. An operating method of a navigation device, the navigation device comprising a memory, an image sensor and a processor electrically coupled to the memory and the image sensor, the operating method comprising:
   successively capturing, by the image sensor, a second previous image frame, a previous image frame and a current image frame;
   calculating, by the processor, a previous displacement according to the second previous image frame and the previous image frame;
   calculating, by the processor, a current displacement and a current speed according to the previous image frame and the current image frame;
   reading a frame period from the memory according to the calculated current speed;
   determining, by the processor, a speed change according to the current displacement and the previous displacement;
   setting a next frame period as the read frame period when the speed change is smaller than an acceleration threshold; and
   setting the next frame period as the read frame period multiplied by an acceleration ratio, which is calculated according to the previous displacement and the current displacement, when the speed change is larger than the acceleration threshold, wherein
   the previous displacement includes a first direction previous displacement and a second direction previous displacement,
   the current displacement includes a first direction current displacement and a second direction current displacement,
   the calculated current speed includes a first direction speed and a second direction speed, and the read frame period is determined according to a bigger one of the first direction speed and a second direction speed, and
   the speed change is a larger absolute value of (i) a first direction difference between the first direction previous displacement and the first direction current displacement, and (ii) a second direction difference between the second direction previous displacement and the second direction current displacement.

8. The operating method as claimed in claim 7, further comprising:
   calculating the first direction speed by dividing the first direction current displacement by a current frame period between the current image frame and the previous image frame; and
   calculating the second direction speed by dividing the second direction current displacement by the current frame period.

9. The operating method as claimed in claim 8, wherein the current frame period is another read frame period accessed from the memory or the another read frame period multiplied by another acceleration ratio.

10. The operating method as claimed in claim 7, wherein when the first direction difference is larger than the second direction difference, the acceleration ratio is a smaller one of (i) the first direction current displacement divided by the first direction previous displacement, and (ii) the first direction previous displacement divided by the first direction current displacement; and
when the second direction difference is larger than the first direction difference, the acceleration ratio is a smaller one of (i) the second direction current displacement divided by the second direction previous displacement, and (ii) the second direction previous displacement divided by the second direction current displacement.

11. The operating method as claimed in claim 7, wherein the navigation device further comprises a light source illuminating the surface and the operating method further comprising:
   adjusting an emission period of the light source corresponding to the next frame period.

12. The operating method as claimed in claim 7, wherein the navigation device further comprises a register storing a flag, and the operating method further comprising:
   changing the flag when the speed change is larger than the acceleration threshold.

13. A navigation device, configured to detect displacement with respect to a surface, the navigation device comprising:
   a memory configured to store a predetermined relationship between a plurality of moving speeds and a plurality of frame periods;
   an image sensor configured to successively capture a second previous image frame, a previous image frame and a current image frame; and
   a processor electrically coupled to the memory and the image sensor, and configured to
      calculate a previous displacement according to the second previous image frame and the previous image frame,
      calculate a current displacement and a current speed according to the previous image frame and the current image frame,
      read a frame period from the memory according to the calculated current speed,
      determine an acceleration according to the current displacement and the previous displacement; and
      set a next frame period as the read frame period multiplied by an acceleration ratio, wherein the acceleration ratio is 1 when the acceleration is smaller than an acceleration threshold while the acceleration ratio is smaller than 1 when the acceleration is larger than the acceleration threshold.

14. The navigation device as claimed in claim 13, wherein
the previous displacement includes a first direction previous displacement and a second direction previous displacement;
the current displacement includes a first direction current displacement and a second direction current displacement;
the calculated current speed includes a first direction speed and a second direction speed, and the read frame period is determined according to a bigger one of the first direction speed and a second direction speed; and
the acceleration is an absolute value of (i) a first direction difference between the first direction previous displacement and the first direction current displacement, and (ii) a second direction difference between the second direction previous displacement and the second direction current displacement.

15. The navigation device as claimed in claim 14, wherein
the first direction speed is calculated by dividing the first direction current displacement by a current frame period between the current image frame and the previous image frame; and the second direction speed is calculated by dividing the second direction current displacement by the current frame period.

16. The navigation device as claimed in claim 14, wherein when the first direction difference is larger than the second direction difference, the acceleration ratio is one of (i) the first direction current displacement divided by the first direction previous displacement, and (ii) the first direction previous displacement divided by the first direction current displacement that is smaller than 1; and when the second direction difference is larger than the first direction difference, the acceleration ratio is one of (i) the second direction current displacement divided by the second direction previous displacement, and (ii) the second direction previous displacement divided by the second direction current displacement that is smaller than 1.

17. The navigation device as claimed in claim 13, further comprising a light source configured to illuminate the surface, wherein the processor is further configured to adjust an emission period of the light source corresponding to the next frame period.

18. The navigation device as claimed in claim 13, further comprising a register electrically coupled to the processor and configured to store a flag indicating whether the acceleration is smaller or larger than the acceleration threshold.

* * * * *